United States Patent
Ayers

(10) Patent No.: US 12,538,072 B2
(45) Date of Patent: Jan. 27, 2026

(54) LOCATION BASED VOICE RECOGNITION SYSTEM AND METHOD

(71) Applicant: Hill-Rom Services, Inc., Batesville, IN (US)

(72) Inventor: Brandon M. Ayers, Carrboro, NC (US)

(73) Assignee: Hill-Rom Services, Inc., Batesville, IN (US)

( * ) Notice: Subject to any disclaimer, the term of this patent is extended or adjusted under 35 U.S.C. 154(b) by 215 days.

(21) Appl. No.: 18/481,360

(22) Filed: Oct. 5, 2023

(65) Prior Publication Data

US 2024/0163604 A1    May 16, 2024

Related U.S. Application Data

(60) Provisional application No. 63/424,209, filed on Nov. 10, 2022.

(51) Int. Cl.
*H04R 1/40*    (2006.01)
*G01S 13/02*    (2006.01)
*G10L 15/22*    (2006.01)

(52) U.S. Cl.
CPC .......... *H04R 1/406* (2013.01); *G01S 13/0209* (2013.01); *G10L 15/22* (2013.01); *G10L 2015/223* (2013.01); *H04R 2430/20* (2013.01)

(58) Field of Classification Search
CPC . H04R 1/406; H04R 2430/20; G01S 13/0209; G10L 15/22; G10L 2015/223
USPC ........................................ 381/56, 58, 91, 92
See application file for complete search history.

(56) References Cited

U.S. PATENT DOCUMENTS

| | | | |
|---|---|---|---|
| 8,626,246 B2 | 1/2014 | Shostak | |
| 9,892,732 B1 | 2/2018 | Tian et al. | |
| 10,095,833 B2 | 10/2018 | Balram et al. | |
| 10,621,980 B2 | 4/2020 | Kim | |
| 10,884,096 B2 | 1/2021 | Baek et al. | |
| 10,925,551 B2 | 2/2021 | Hays et al. | |
| 11,024,311 B2 | 6/2021 | Mixter et al. | |
| 11,062,707 B2 | 7/2021 | Judy et al. | |
| 11,200,897 B2 | 12/2021 | Yi et al. | |
| 11,302,338 B2 | 4/2022 | Bechtel et al. | |
| 2019/0028803 A1* | 1/2019 | Benattar | H04S 7/304 |
| 2019/0156847 A1* | 5/2019 | Bryan | G10L 21/0232 |
| 2019/0208318 A1* | 7/2019 | Chowdhary | B81B 7/00 |
| 2021/0350823 A1 | 11/2021 | Wexler et al. | |
| 2022/0044772 A1 | 2/2022 | Moghadam et al. | |
| 2022/0101847 A1 | 3/2022 | Receveur et al. | |

OTHER PUBLICATIONS

Vocera, Vocera Badge User Guide (Year: 2019).*
International Search Report and Written Opinion; PCT Patent Application No. PCT/US2023/76541; Mar. 21, 2024, 13 pages.

(Continued)

*Primary Examiner* — William A Jerez Lora
(74) *Attorney, Agent, or Firm* — Barnes & Thornburg LLP

(57) ABSTRACT

A system for operating a communication device in a healthcare facility includes a locating system configured to determine locations of assets in the healthcare facility. The system also includes a communication device having a microphone array configured to detect sound signals within a detection lobe defined by an angle and an accelerometer to determine an orientation of the device.

20 Claims, 7 Drawing Sheets

(56) References Cited

OTHER PUBLICATIONS

Vocera Badge User Guide B3000n Compatible; Vocera Communications, Inc.; 2002-2016, last modified Jun. 28, 2016; 133 pages. See pp. 32-33.
Vocera B-Series Badge User Guide; Vocera Communications, Inc.; 2002-2022, last modified Feb. 16, 2022; 123 pages. See pp. 35-38.

* cited by examiner

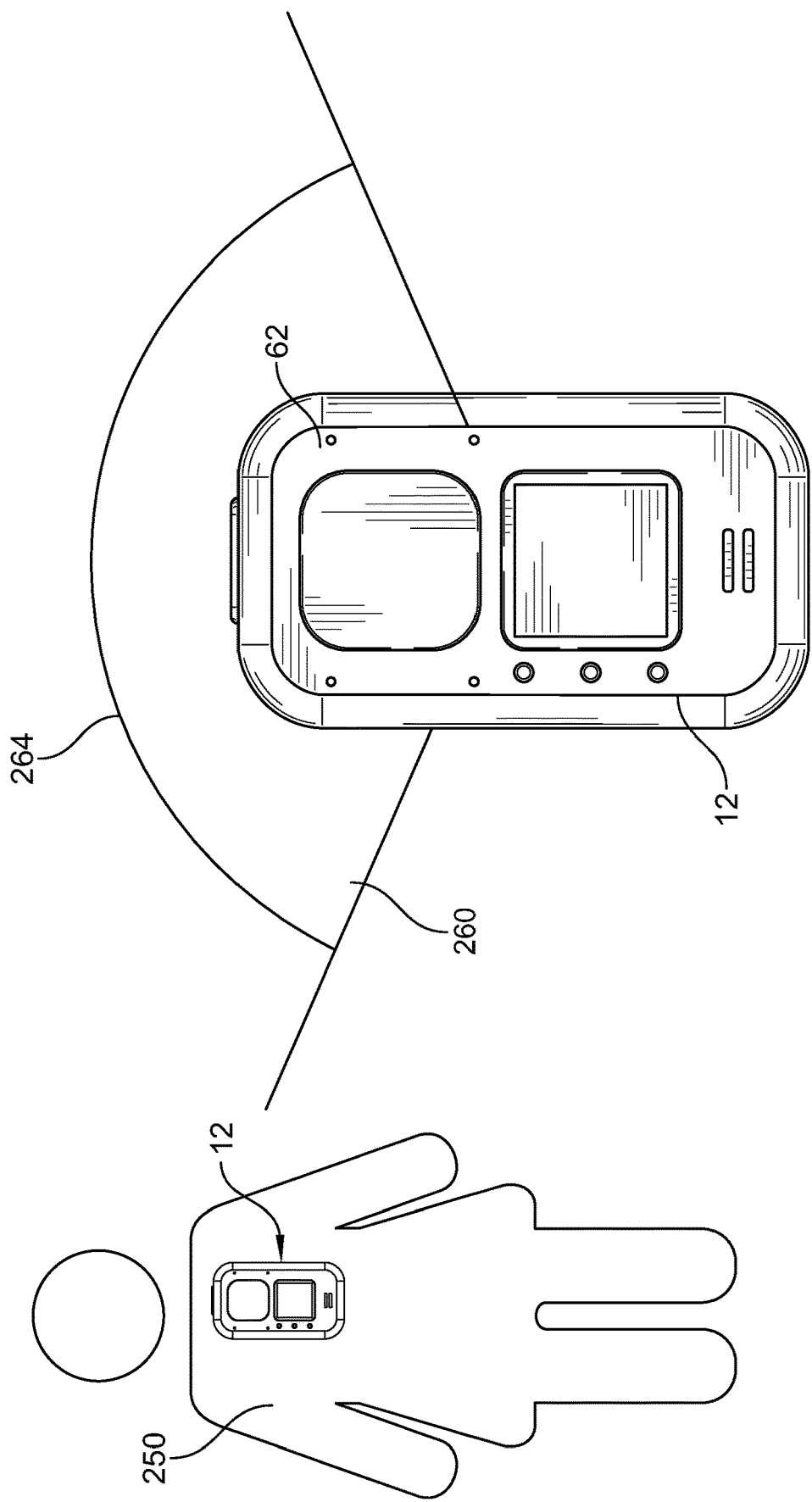

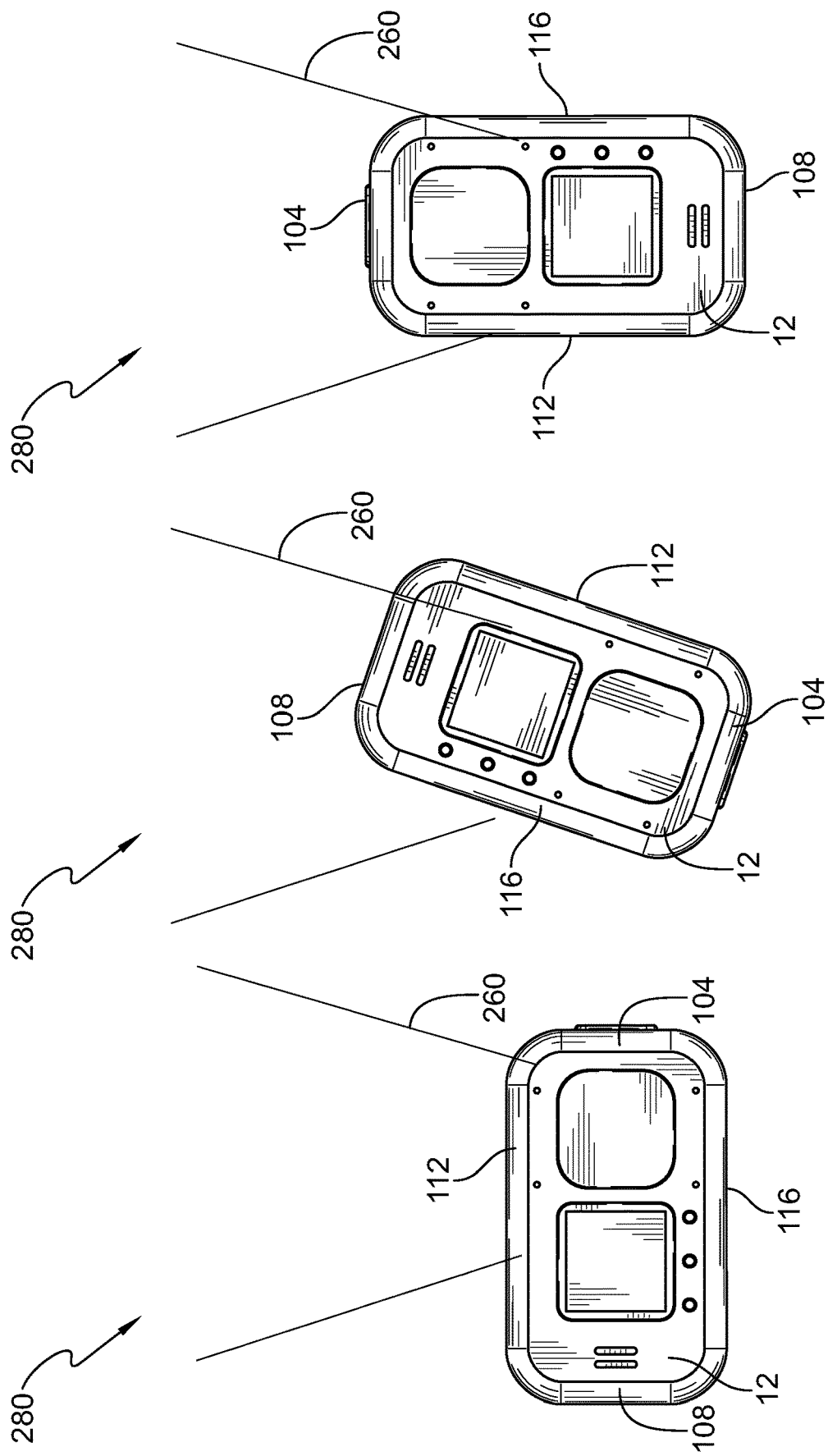

LOCATION BASED VOICE RECOGNITION SYSTEM AND METHOD

CROSS-REFERENCE TO RELATED APPLICATIONS

This application claims priority under 35 U.S.C. § 119(e) to U.S. Provisional Patent Application Ser. No. 63/424,209, filed Nov. 10, 2022 and titled "LOCATION BASED VOICE RECOGNITION SYSTEM AND METHOD," which is herein incorporated by reference in its entirety.

BACKGROUND

The present disclosure generally relates to a wearable communication device and, more particularly, to a hands-free, voice enabled wearable communication device for use in care settings.

Wearable communication devices are commonly used to communicate in healthcare facilities. The devices typically include a display, a microphone configured to detect sound signals, and a speaker. The devices authenticate a caregiver based on the detection of voice recognition commands. When multiple users of a hands-free voice communication system are co-located then it can be difficult to use voice recognition commands because multiple devices can be listening or responding, thereby creating confusion and work flow conflicts. A real-time locating system can determine to position of each of a plurality of devices within the healthcare facility.

SUMMARY

The present disclosure includes one or more of the features recited in the appended claims and/or the following features which, alone or in any combination, may comprise patentable subject matter.

According to a first aspect of the disclosed embodiments, a communication device for use in a healthcare facility having a locating system configured to determine locations of assets in the healthcare facility is provided. The communication device includes a housing configured to be worn by a caregiver. A microphone array is carried by the housing and is configured to detect sound signals within a detection lobe defined by an angle. A controller is configured to adjust a magnitude of the angle of the detection lobe in response to at least one message received from the locating system.

In some embodiments of the first aspect, the controller can increase the magnitude of the angle of the detection lobe when the controller receives a message from the locating system that the device is the only device within a predetermined distance. The controller can decrease the magnitude of the angle of the detection lobe when the controller receives a message from the locating system that more than one device is positioned within a predetermined distance. The controller can decrease the magnitude of the angle of the detection lobe when the controller receives a message from the locating system that the device is positioned adjacent to a patient bed.

Optionally, in the first embodiment, the microphone array can include a plurality of microphones and each microphone of the plurality of microphones can receives at least one of a plurality of sound signals. The controller can determine a time of arrival of each of the plurality of sound signals at the respective microphone of the plurality of microphones. The controller can infer a location of a source of each sound signal of the plurality of sound signals based on the time of arrival of each of the plurality of sound signals. The controller can adjust the magnitude of the angle of the detection lobe by only processing the sound signals in directions of interest. The sound signals detected by the microphone array within the detection lobe can include voice commands from the caregiver.

It can be desired, in the first aspect, that the controller can communicate with the locating system through wireless signals. The controller can communicate with remote devices in the healthcare facility through wireless signals. The microphone array can include a plurality of settings that are remotely adjustable. The locating system can be an ultra-wideband locating system.

According to a second aspect of the disclosed embodiments, a communication device for use in a healthcare facility includes a housing configured to be worn on a caregiver. A microphone array is positioned within the housing and is configured to detect sound signals within a detection lobe defined by an angle. An accelerometer determines an orientation of the housing. A controller is configured to adjust a direction of the detection lobe based on input from the accelerometer.

In some embodiments, of the second aspect, the controller can adjust the direction of the detection lobe so that a zenith of the detection lobe is directed upward from a ground surface. The controller can communicates with a locating system to determine a position of the housing. The controller can adjust a magnitude of an angle of the detection lobe based a message from the locating system. The locating system can be an ultra-wideband locating system. The microphone array can include a plurality of microphones and each microphone of the plurality of microphones can receive at least one of a plurality of sound signals. The controller can determine a time of arrival of each of the plurality of sound signals at the respective microphone of the plurality of microphones. The controller can infer a location of a source of each sound signals of the plurality of sound signals based on the time of arrival of each of the plurality of sound signals. The controller can adjust the magnitude of the angle of the detection lobe by only processing the sound signals in directions of interest. The sound signals detected by the microphone array within the detection lobe can include voice commands from the caregiver.

It may be desired, in the second aspect, that the controller can communicates with a locating system through wireless signals. The controller can communicate with remote devices in the healthcare facility through wireless signals. The microphone array can include a plurality of settings that are remotely adjustable.

According to a third aspect of the disclosed embodiments, a system for operating a communication device in a healthcare facility includes a locating system configured to determine locations of assets in the healthcare facility. The system also includes a communication device having a housing configured to be worn by a caregiver. A microphone array is carried by the housing and is configured to detect sound signals within a detection lobe defined by an angle. An accelerometer determines an orientation of the housing. A controller is configured to adjust a magnitude of the angle of the detection lobe in response to at least one message received from the locating system. The controller is further configured to adjust a direction of the detection lobe based on input from the accelerometer.

According to a fourth aspect of the disclosed embodiments, a communication device for use in a healthcare facility having a locating system configured to determine locations of assets in the healthcare facility is provided. The communication device includes a housing configured to be worn by a caregiver. A microphone array is carried by the housing and is configured to detect sound signals within a detection lobe. A controller is configured to adjust a parameter of the microphone array in response to at least one message received from the locating system.

In some embodiments of the fourth aspect, the controller can adjust a parameter of the microphone array by increasing a magnitude of an angle of the detection lobe when the controller receives a message from the locating system that the device is the only device within a predetermined distance. The controller can adjust a parameter of the microphone array by decreasing a magnitude of an angle of the detection lobe when the controller receives a message from the locating system that more than one device is positioned within a predetermined distance. The controller can adjust a parameter of the microphone array by decreasing a magnitude of an angle of the detection lobe when the controller receives a message from the locating system that the device is positioned adjacent to a patient bed. The controller can adjust a parameter of the microphone array by increasing a magnitude of a width of the detection lobe when the controller receives a message from the locating system that the device is the only device within a predetermined distance. The controller can adjust a parameter of the microphone array by decreasing a magnitude of a width of the detection lobe when the controller receives a message from the locating system that more than one device is positioned within a predetermined distance. The controller can adjust a parameter of the microphone array by decreasing a magnitude of a width of the detection lobe when the controller receives a message from the locating system that the device is positioned adjacent to a patient bed. The controller can adjust a parameter of the microphone array by adjusting a volume of the sound signals required to activate the device. The controller can increase the volume of the sound signal required to activate the device in response to the locating system determining that the device is in a noisy area. The controller can decrease the volume of the sound signal required to activate the device in response to the locating system determining that the device is in a quiet area. The controller can adjust a parameter of the microphone array by adjusting a gain of at least one microphone in the microphone array. The controller can adjust a parameter of the microphone array by adjusting a sensitivity of at least one microphone in the microphone array. The controller can adjust a parameter of the microphone array based on a number of caregivers in proximity to the device. The number of caregivers in proximity to the device can be determined based on the at least one message received from the locating system. The parameter of the microphone array can be at least one of a size of the detection lobe, a magnitude of an angle of the detection lobe, a magnitude of a width of the detection lobe, and a volume required to activate the device. The locating system can be an ultra-wideband locating system.

According to a fifth aspect of the disclosed embodiments, a communication device for use in a healthcare facility having a locating system configured to determine locations of assets in the healthcare facility is provided. The communication device includes a housing configured to be worn by a caregiver. A microphone is carried by the housing and configured to detect sound signals. Locating circuitry is carried by the housing. The locating circuitry includes communication circuitry configured to communicate ultra wideband signals with a plurality of anchor devices within a healthcare facility to determine the location of the communication device. A controller is carried by the housing and configured to process signals from the microphone in order to process voice commands of a caregiver and from the locating circuitry.

In some embodiments of the fifth aspect, the controller can be configured to adjust a magnitude of an angle of a detection lobe of the microphone in response to at least one message received from the locating circuitry. The controller can increase the magnitude of the angle of the detection lobe when the control system receives a message that the device is the only device within a predetermined distance. The controller can decrease the magnitude of the angle of the detection lobe when the control system receives a message that the device is not the only device within a predetermined distance. The controller can be configured to adjust a parameter of the microphone in response to at least one message received from the locating circuitry.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION

The detailed description particularly refers to the accompanying figures in which:

FIG. 5 illustrates a lone caregiver detected by the locating system shown in FIG. 1, wherein the voice recognition communication device worn by the lone caregiver is at least a predetermined distance from any other voice recognition communication device;

FIG. 6 illustrates a detection lobe of the microphone array having an angle that has been adjusted for the lone caregiver shown in FIG. 5;

FIG. 10 illustrates the direction of the detection lobe of the microphone array shown in FIGS. 2 and 3 when the voice recognition communication device is in a sideways position;

FIG. 11 illustrates the direction of the detection lobe of the microphone array shown in FIGS. 2 and 3 when the voice recognition communication device is in an upside down position; and FIG. 12 illustrates the direction of the detection lobe of the microphone array shown in FIGS. 2 and 3 when the voice recognition communication device is in a right-side up position.

DETAILED DESCRIPTION

Figure 1:
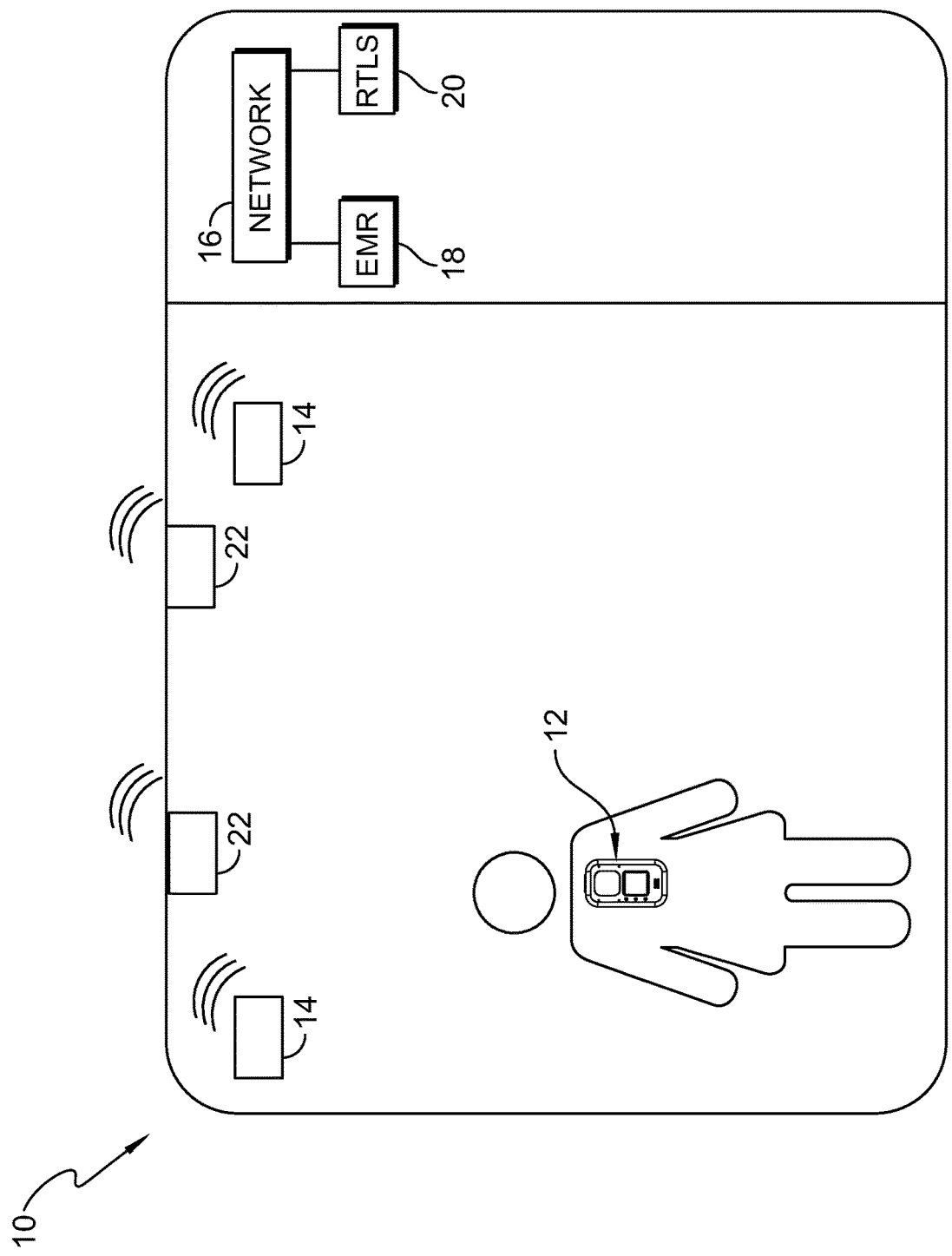
FIG. 1 is a schematic view of a location based voice recognition system in accordance with an embodiment and including a locating system and a voice recognition communication device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

The disclosed embodiments provide a communication and control system 10 that optimizes microphones for the detection of voice commands with a voice recognition communication device 12. For example, when a caregiver is alone, a locating service determines that no other devices 12 are nearby so there is a low probability of multiple devices 12 responding. Accordingly, the system 10 automatically increases a sensitivity of the microphone array and changes a beamforming/directionality of the microphone array. When caregiver is crowded by others, for example, standing around a patient bed, the system 10 optimizes the microphones for detection of voice commands from a single user to prevent accidentally having multiple devices 12 respond. That is, the locating service determines that other devices 12 are nearby so there is a high probability of multiple devices responding to a voice command. Accordingly, the system 10 automatically decreases the sensitivity of the microphone array and changes the beamforming/directionality of microphone array to a tight lobe directed at the wearer.

In some embodiments, an accelerometer is positioned in the device 12 to determine an orientation of the device 12. In such embodiments, if the device 12 is not oriented in a default vertical position a detection lobe for the microphone array is steered to a desired direction, for example, with a zenith position always pointing upward. While it is desirable to have the zenith pointing upward, the ability for beam steering the detection lobe is limited in some embodiments such that the zenith is steered toward the upward direction as much as possible, within the steering limits. In any event, the present disclosure contemplates that the communication device 12 is able to implement both beamforming to widen and narrow the angle of the detection lobe within minimum and maximum angles, and beam steering to alter an orientation of the zenith of the detection lobe within directional limits.

Referring to FIG. 1, the communication and control system 10 includes a plurality of communication devices 12 communicatively coupled via gateway devices 14 over a network 16 in a healthcare facility. In an exemplary embodiment, the gateway devices 14 wirelessly communicate with the communication devices 12 and the network 16. The communication devices 12 are configured to process voice recognition and authentication to recognize the voice of one or more caregivers associated with the communication devices 12. For example, caregivers and staff of a facility (e.g., nurses, doctors, technicians, maintenance staff, etc.), upon starting employment with the healthcare facility, have their voice recorded and linked to one or more care or service groups. The care groups associated with each caregiver are assigned and stored in the directory, which maps the care groups for communication and alert processes. The care groups is defined based on the specific skills, certifications, training, etc. for each caregiver, in some embodiments. Based on the association of each of the caregivers to each of the care groups, communications associated with each caregiver's respective skills are communicated to the communication device 12 and assigned to the caregiver. In this way, communications over the network 16 are routed to the communication devices 12 assigned to caregivers who are qualified to respond to a particular call, in some embodiments.

In addition to the association of each caregiver to the care groups, the voice recognition of the caregiver is linked to the caregiver's unique identification, which includes information in addition to professional qualifications associated with the care groups, in some embodiments. For example, in some embodiments, the communication device 12 identifies the voice associated with a caregiver to authorize badge access information, computer or hospital network terminal access, voice controlled room control commands (e.g., light control, equipment settings, etc.), and various other information that is associated with the activities of the caregiver. Additionally, some voice commands, e.g. room control commands, are universal to the command databases. In this way, some voice commands are universal to doctors, nurses, housekeeping, etc.

While some voice commands and communications are authorized to all caregivers, as noted previously, some voice commands require recognition of a voice of a caregiver associated with an authorized care group or having the authorization to initiate a request. In some embodiments, based on the identity of the caregiver associated with the voice recorded by the communication device 12, the communication device 12 authorizes a voice command or input into the communication device 12 or access to a device in communication with the network 16. As a result of the association of the voice command to the caregiver, the communication device 12 is instructed to act on a voice command that is restricted to one or more care groups or caregivers with necessary authorization. In this way, the communication device 12 prevents false or unauthorized access to alert functions (e.g. sending alerts to improper staff).

In addition to providing authorization, the voice recognition is implemented to document medical information associated with a patient and the corresponding activities of the caregiver. For example, in some embodiments, if a nurse issues a command to administer medication, an electronic medical record 18 is updated to reflect that medication was requested. When the medication is administered, the nurse utilizes the communication device 12 to update the electronic medical record 18 with the date, time, and dosage of medication. In some examples, the communication devices 12 are coupled to a real time locating system server (RTLS) 20 to enable various voice commands. In this way, various voice command databases are activated based on the whereabouts of caregivers.

The RTLS 20 includes a multitude of anchor devices or transceivers 22 in communication with the communication devices 12. The transceivers 22 are dispersed throughout the healthcare facility. The communication devices 12 and the transceivers 22 each include an associated circuitry including, for example, a processor such as a microprocessor or microcontroller or the like, memory for storing software, and communications circuitry including a transmitter, a receiver and at least one antenna, for example. The transceivers 22 each include mounting hardware, such as brackets or plates or the like, in some embodiments, to permit the transceivers 22 to be mounted at fixed locations in the healthcare facility with fasteners such as screws or the like.

The transceivers 22 communicate wirelessly with communication devices 12 using radio frequency (RF). According to this disclosure, RTLS 20 operates as a high-accuracy locating system which is able to determine the location of the communication devices 12 within one foot (30.48 cm) or less of the device's actual location. RTLS 20 is operable to determine the location of the communication devices 12 in 2-dimensional space. One example of a high-accuracy locating system contemplated by this disclosure is an ultra-wideband (UWB) locating system. UWB locating systems operate within the 3.1 gigahertz (GHz) to 10.6 GHz frequency range. Accordingly, the communication devices 12 are tracked by the RTLS 20 to monitor the location of the caregiver. Data related to movement of the caregiver is transmitted over the network 16.

Figure 3:
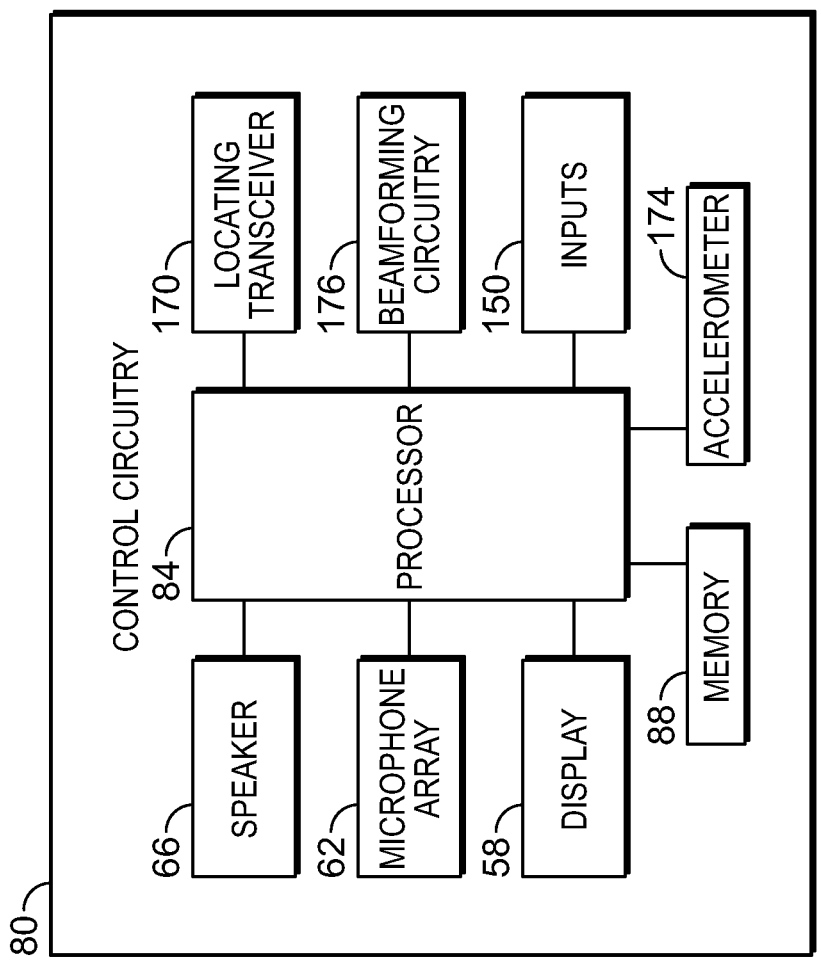
FIG. 3 is a schematic of control circuitry for the voice recognition communication device shown in FIG. 1.
Figure 2:
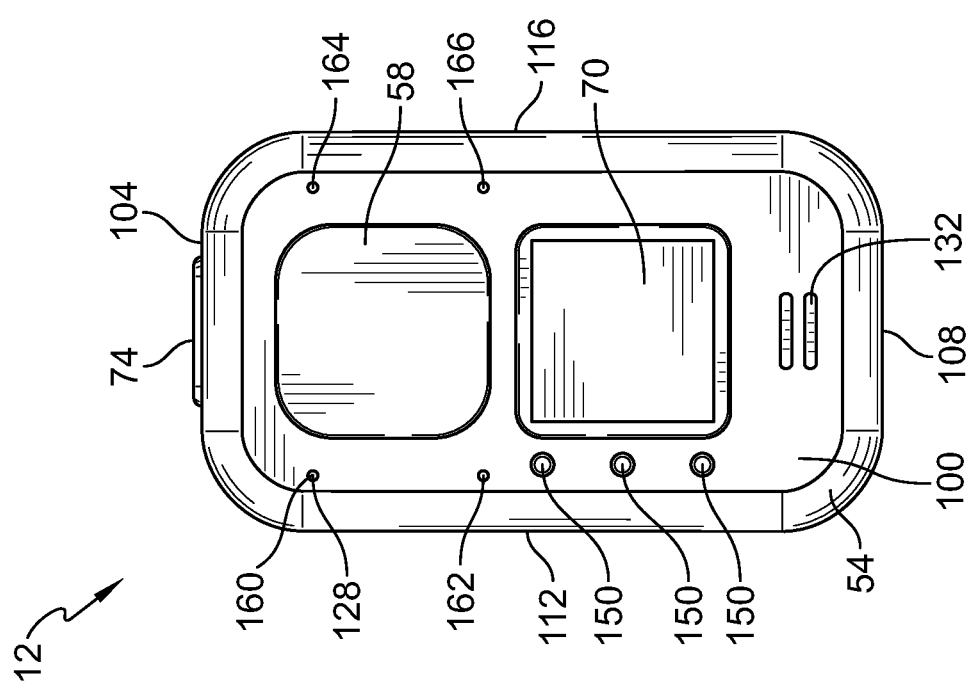
FIG. 2 is a top view of e voice recognition communication device shown in FIG. 1.

Referring to FIGS. 2-3, the communication device 12 is in the form of a wearable communication device. The communication device 12 includes a housing 54 configured to be worn on a caregiver, a display 58 disposed on the housing 54, a microphone array 62 configured to detect sound signals, and a speaker 66 configured to convert an electromagnetic wave input into a sound wave output. The communication device 12 further includes a voice command button 70 and a controller or control circuitry 80 (shown in FIG. 3). The controller 80 is configured to control or receive input from the display 58, the microphone 62, the speaker 66, the voice command button 70, and the at least one help button 74. The controller 80 includes a processor 84 and a memory 88. The memory 88 stores instructions that when executed by the processor 84 cause the processor 84 to function as described herein. The controller 80 communicates with the locating system and remote devices in the healthcare facility through wireless signals.

The housing 54 is configured to be worn on, or by, a caregiver (i.e. on the caregiver's body). As illustrated, the housing 54 defines a front surface 100, an upper surface 104, a lower surface 108, a first side surface 112, a second side surface 116, and a back surface (not shown). The housing 54 includes an attachment feature, which facilitates the use of the communication device 12 as being wearable. In some aspects, the attachment feature includes a circlet, or loop, which is configured to receive a lanyard, a clip, a band configured to be worn around a body part, such as a wrist, etc. The housing 54 defines a plurality of microphone ports 128 and speaker ports 132.

Further, the housing 54 includes the display 58 configured to display messages, notifications, alerts, and the like. The display 58 is coupled to and/or integrally formed with the front surface 100 of the communication device 12. This configuration is advantageous for allowing the caregiver, or user, to grasp the first and/or second side surfaces 112, 116 of the communication device 12 without interfering with the display 58. Further, if the caregiver grasps the communication device 12, the display 58 remains visible to the user. In various examples, the display 58 is configured as a user-interface, such as a touch screen.

In some examples, the housing 54 includes a camera. The camera is communicatively coupled to the controller 80, such that the controller 80 controls operation of the camera. Operation of the camera includes turning the camera on or off and recording video data received by the camera.

Further, the display 58 presents a plurality user options. The plurality of user options includes selectable features relating to call contact information, settings, and/or user preferences in non-limiting examples. The caregiver selects one of the selectable features, which, in some embodiments, results in a subsequent and different view, or screen, being displayed in response to a user input. In this way, the subsequent screen is a second level screen relative to the previous screen (e.g., displayed after one user input). The layers of the display 58 is advantageous for preventing inadvertent activation of a function of the communication device 12. In this way, a plurality of second user options is displayed in response to a selection of one of a first plurality of first user options, and a third plurality of user options is displayed in response to selection of one of the plurality of the second user options.

The housing 54 includes a variety of selectable input features 150 configured as soft key, buttons, switches, similar tactile features, and/or combinations thereof, etc. that operate as display control buttons. The voice command button 70 is in the form of a tactile button, in some embodiments. Optionally, a LED ring is disposed around the voice command button 70. In some aspects, the display control buttons 150 are in the form of up, down, and select buttons. Further, the display control buttons 150 also function to control a volume level for output from the speaker 66. When a selection is made by the user, a subsequent display screen is displayed on the display 58. In this way, selecting the desired selectable feature (e.g., the voice command button 70) provides access to a corresponding subsequent display screen in order to access various databases related to the healthcare facility, including, but not limited to call contact databases, provider grouping databases, etc.

Notifications displayed on the display 58, or emitted through the speaker 66, include various notifications intended for the caregiver. Notifications include messages (i.e. voice, sound or text) from other devices of the network 16 and/or other communication devices 12 according to aspects described herein. In some embodiments, the messages include caller, or call information, countdown timer messages (for example, countdown timers from which have reached a minimum threshold), global messages generated for pre-determined groups of staff (for example, all caregivers having a specific certification), automated messages from caregiver monitoring systems, call response messages (for example, information request calls and/or equipment request calls), and direct caregiver messages (for example, messages received from other caregivers).

The microphone array 62 includes an upper left microphone 160, a lower left microphone 162, an upper right microphone 164, and a lower right microphone 166. In some embodiments, the microphone array 62 includes any number of microphones. The microphone array include a plurality of settings that are remotely adjustable, in some embodiments. Each of the microphones 160, 162, 164, and 166 detect sound signals within a detection lobe (described in more detail below). As described herein, a magnitude of an angle of the detection lobe is adjusted to optimize the detection of voice commands from a caregiver wearing the communication device 12. In some embodiments, the detection lobe is adjusted based on a position of the device 12 as determined by a locating transceiver or circuitry 170. In some embodiments, the locating transceiver 170 determined the location of the device 12 and communicates the location of the device 12 to the transceivers 22 of the RTLS system 20 and the location of the device 12 is compared to the location of other devices 12 in the system 10.

Additionally, a direction of the detection lobe is adjustable so that a zenith position of the detection lobe is always pointing upward. In such an embodiment, an accelerometer 174 determines an orientation of the device 12. The microphone array 62 is adjusted based on the orientation of the device 12.

In the exemplary embodiments, the detection lobe is adjusted and/or oriented using beamforming circuitry 176. In some embodiments, the beamforming circuitry 176 includes a digital signal processor that is modified to perform the methods described herein. In one embodiment the digital signal processor is the i.MX RT600 Crossover MCU with Arm® Cortex®-M33 and DSP Cores sold by NXP Semiconductors. Product information for the i.MX RT600 Crossover MCU with Arm® Cortex®-M33 and DSP Cores is available at www.nxp.com and incorporated herein by reference. The beamforming circuitry 176 amplifies the signal from each microphone 160, 162, 164, and 166 by a different weight. Different weighting patterns are used to achieve the desired sensitivity patterns. A main lobe is produced together with nulls and sidelobes. As well as controlling the main lobe width (beamwidth) and the sidelobe levels, the position of a null is controlled by the beamforming circuitry 176. This is useful to ignore noise or jammers in one particular direction, while listening for events in other directions.

The beamforming circuitry 176 uses a fixed set of weightings and time-delays (or phasings) to combine the signals from the microphones 160, 162, 164, and 166 in the microphone array 62, primarily using only information about the location of the microphones 160, 162, 164, and 166 in space and the wave directions of interest. Alternatively, the beamforming circuitry 176 combines this information with properties of the signals actually received by the microphones 160, 162, 164, and 166, typically to improve rejection of unwanted signals from other directions. This process is carried out in either the time or the frequency domain.

In one embodiment, the beamforming circuitry 176 extracts sound sources in a room by using the time of arrival from the sources to microphone array 62 and inferring the locations from the distances. In some embodiments, the signals are separated into frequency bands prior to beamforming because different frequencies have different optimal beamform fillers and are treated separately, in parallel, and then recombined afterward. Properly isolating the bands involves specialized non-standard filter banks. In some embodiments, filters are designed in which only local frequencies are detected by each channel while retaining the recombination property to be able to reconstruct the original signal.

Figure 4:
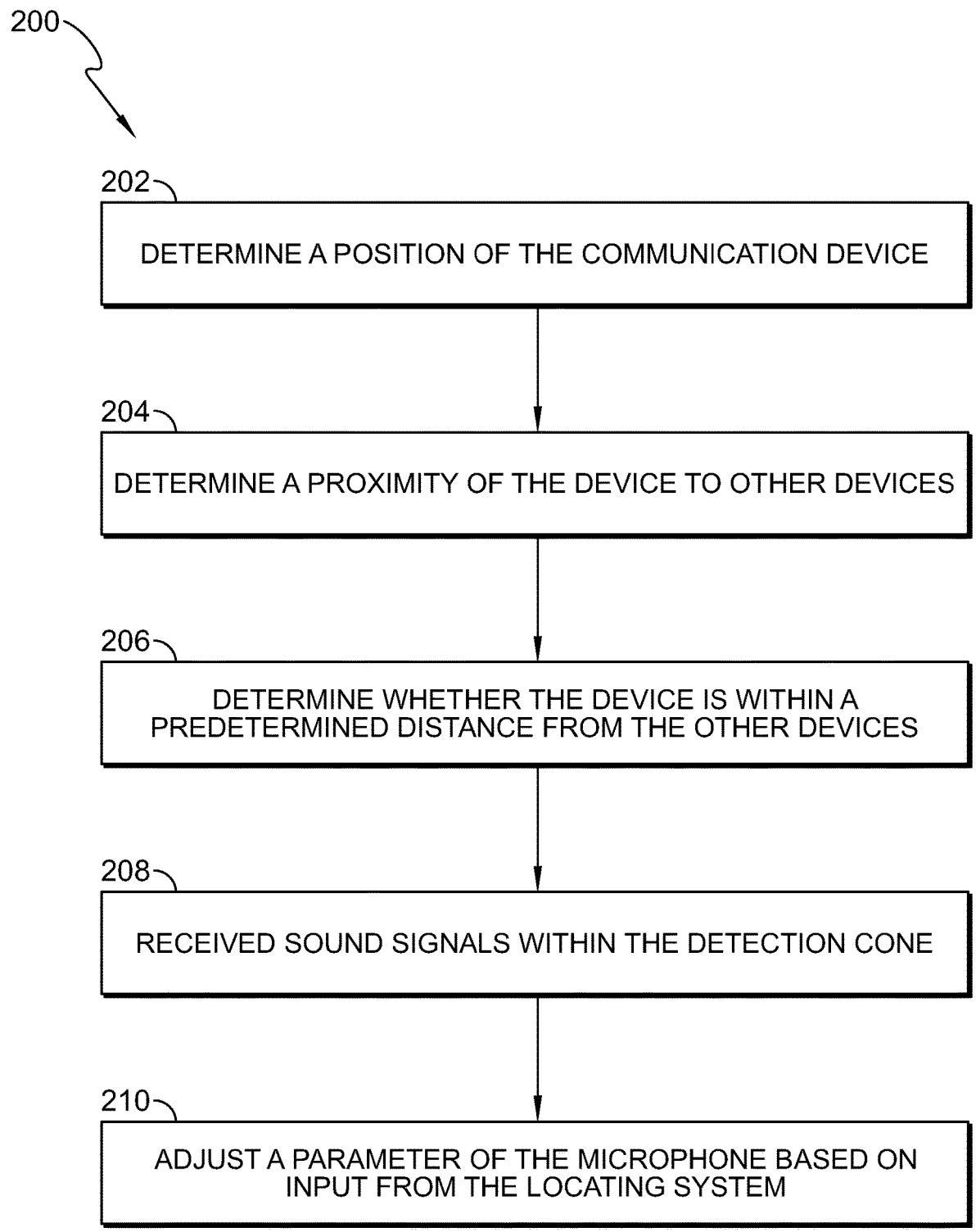
FIG. 4 is a flowchart for a method for adjusting an angle of a detection lobe of the microphone array shown in FIGS. 2 and 3.

Referring now to FIG. 4, a method 200 for adjusting a parameter of the microphone array 62 includes communicating, at block 202, with a locating system to determine a position of the communication device 12. For example, the locating system determines a position of the housing 54 of the communication device 12. In some embodiments, the locating system is the RTLS 20, shown in FIG. 1. Accordingly, the locating transceiver 170 positioned within the housing 54 communicates with the RTLS system 20. The RTLS system 20 compares the position of the device 12 to the position of other devices 12 in the system 10 to determine a proximity of the device 12 to other devices 12, at block 204. At block 206, the system 10 determines whether the device 12 is within a predetermined distance from the other devices 12.

At block 208, the microphone array 62 receives sound signals within a detection lobe. In the exemplary embodiment, the sound signals detected by the microphone array 62 within the detection lobe include voice commands from the caregiver. The controller 80 adjusts a parameter of the microphone array 62 in response to at least one message received from the locating system, at block 210. In one embodiment, the controller 80 adjusts a parameter of the microphone array 62 by adjusting a sensitivity of the microphones 160, 162, 164, and 166 of the microphone array 62. For example, the gain of at least one of the microphones 160, 162, 164, and 166 of the microphone array 62 is adjusted, in an embodiment. In some embodiments, a magnitude of a size of the detection lobe is adjusted. For example, a magnitude of an angle and/or a magnitude of a width of the detection lobe is adjusted. In some embodiments, the parameter is adjusted based on the detected location of the device 12 by the RTLS 20. In some embodiments, the parameter is adjusted based on whether the device 12 is within the predetermined distance from other devices 12.

In an exemplary embodiment, each microphone 160, 162, 164, and 166 of the microphone array 62 receives at least one of a plurality of sound signals. The beamforming circuitry 176 then determines a time of arrival of each of the plurality of sound signals at the respective microphone 160, 162, 164, and 166. The beamforming circuitry 176 infers a location of a source of each sound signal of the plurality of sound signals based on the time of arrival of each of the plurality of sound signals. The controller 80 then adjusts the magnitude of the size of the detection lobe by only processing the sound signals from the microphones 160, 162, 164, and 166 in directions of interest. In some embodiments, the beamforming circuitry 176 uses any of the beamforming methods described above or known in the art to adjust the magnitude of the sire of the detection lobe.

In some embodiments, the controller 80 adjusts the parameter of the microphone array 62 based on a number of caregivers in proximity to the device 12. In an exemplary embodiment, the number of caregivers in proximity to the device 12 is determined based on a message received from the locating system. For example, in FIGS. 5-6, a caregiver 250 is illustrated wearing a communication device 12. Notably, the caregiver 250 is not positioned near another caregiver. The location system, for example, the RTLS 20, determines a location of the caregiver 250. In some embodiments, the location system determines that the caregiver 250 is not within the predetermined distance from another caregiver. The predetermined distance is a measurement of distance, for example, at least three feet, in some embodiments. In some embodiments, the location system determines that the caregiver 250 is not in a patient room with any other caregivers. In some embodiments, the location system, for example, the RTLS 20, determines that the caregiver 250 is a predetermined distance from a patient bed or not in a room with a patient bed. As seen in FIG. 6, the detection lobe 260 extends outward from the device 12 and is defined by an angle. In an embodiment where the caregiver 250 is alone, as described with respect to FIG. 5, the controller 80 increases the magnitude of the angle of the detection lobe 260 to a widened angle 264.

Figure 8:
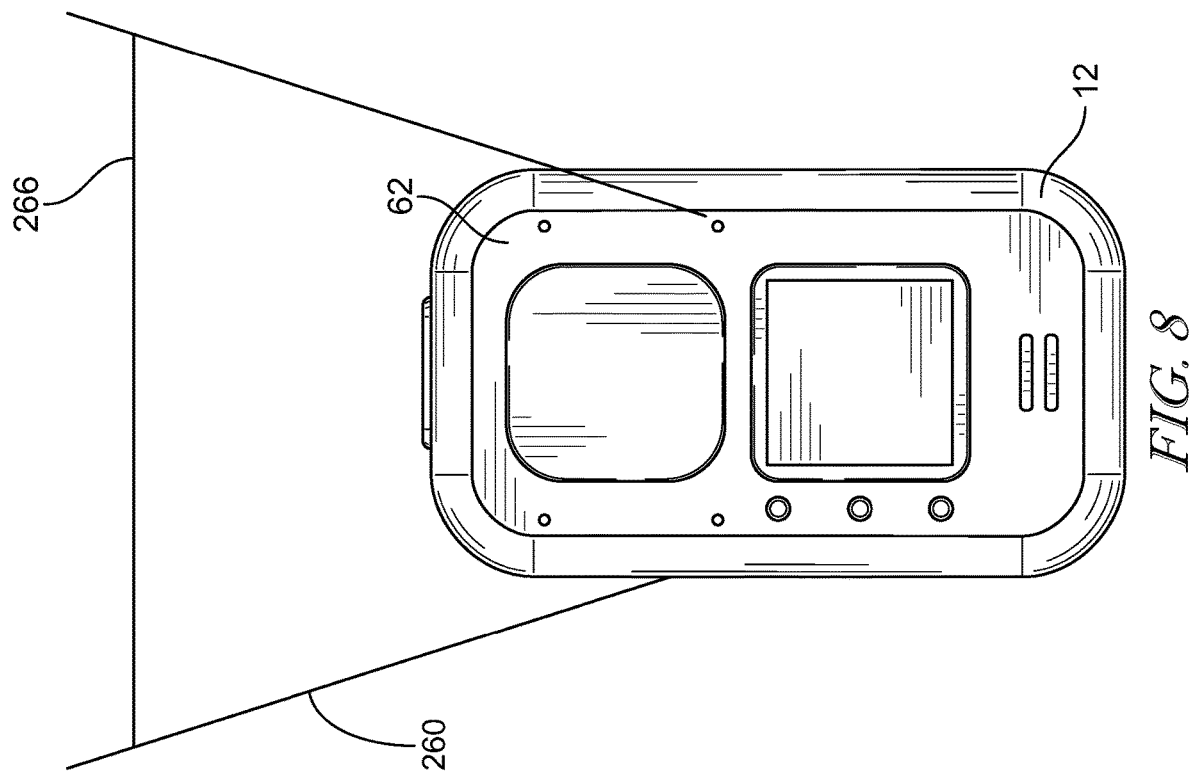
FIG. 8 illustrates a detection lobe of the microphone array having an angle that has been adjusted for the caregiver shown in FIG. 7, wherein the angle of the detection lobe shown in FIG. 8 is less than the angle of the detection lobe shown in FIG. 6.
Figure 7:
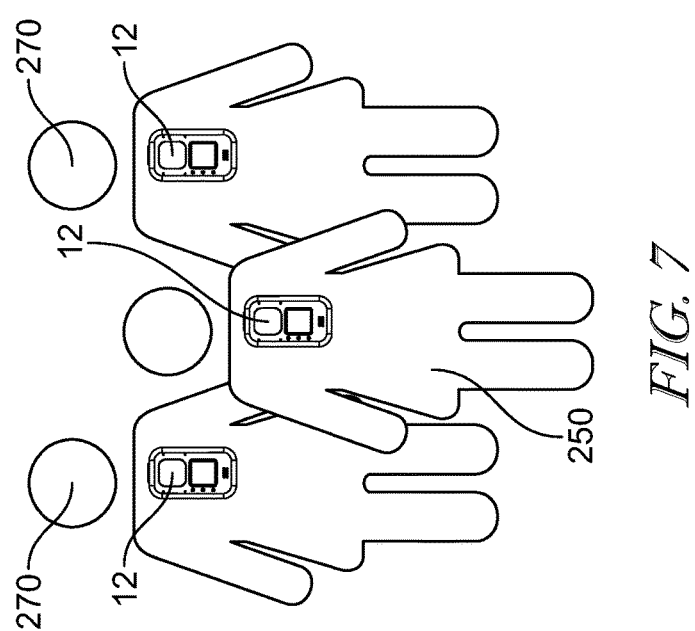
FIG. 7 illustrates the caregiver shown in FIG. 5 positioned in a group of other caregivers, wherein the voice recognition communication device worn by the caregiver is within the predetermined distance from the voice recognition communication devices worn by at least one of the other caregivers.

In one example shown in FIGS. 7-8, the caregiver 250 is illustrated in a crowd of other caregivers 270. That is, the caregiver 250 is within the predetermined distance from the other caregivers 270. In other embodiments, the caregiver 250 is located in a patient room with other caregivers 270. In some embodiments, the caregiver 250 is positioned within a predetermined distance from a patient bed. As seen in FIG. 8, when the caregiver 250 is not alone, as described with respect to FIG. 6, the controller 80 decreases the magnitude of the angle of the detection lobe 260 to a narrowed angle 266 and focuses the detection lobe on the caregiver 250 associated with the device 12. It will be appreciated that the narrowed angle 266 is smaller than the widened angle 264. By focusing the detection lobe 260 to the narrowed angle 266, the controller 80 limits sounds detected by the microphone array 62 to sound from the caregiver 250 and filters out sounds from the other caregivers 270.

In one embodiment, the controller 80 adjusts a parameter of the microphone array 62 by adjusting a volume of sound required to activate the device 12. For example, is typical settings, the volume of background noise is approximately 60 decibels. Accordingly, the device 12 is configured to activate in response to a voice command having a volume over 60 decibels. In some embodiments, for example, in an emergency department, the volume of background noise is greater than 60 decibels. If the location system determines that the caregiver is in the emergency department, the controller 80 adjusts the microphones to activate at a greater decibel level than in typical settings. In some embodiments, for example, in a post-operative unit, the volume of background noise is less than 60 decibels. If the location system determines that the caregiver is in the post-operative unit, the controller 80 adjusts the microphones to activate at a lower decibel level than in typical settings. In some embodiments, the controller 80 increases the volume of a sound signal required to activate the device 12, if the locating system determines that the device 12 is in a noisy area. In some embodiments, the controller 80 decreases the volume of a sound signal required to activate the device 12, if the locating system determines that the device 12 is in a quiet area.

Figure 9:
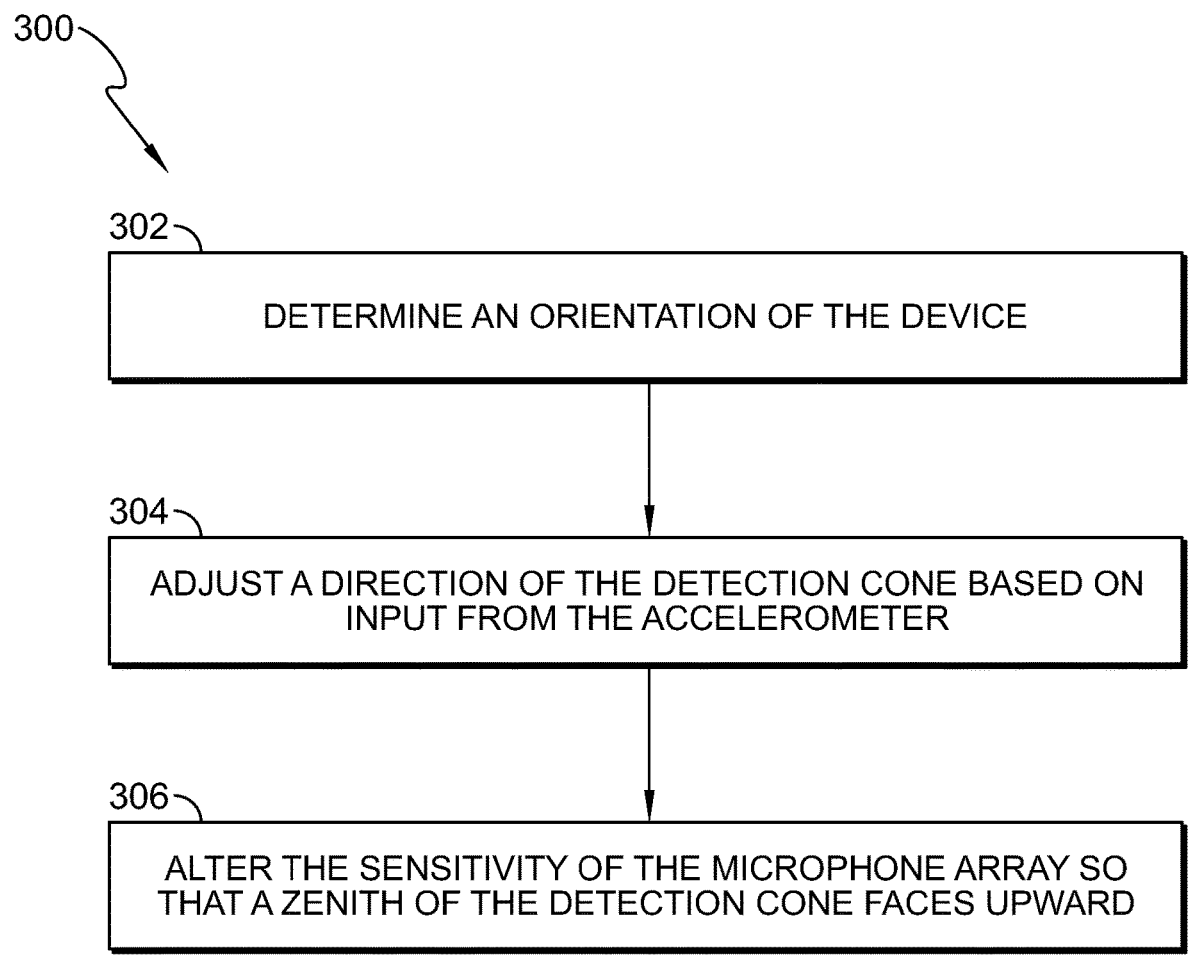
FIG. 9 is a flowchart for a method of directing the detection lobe of the microphone array shown in FIGS. 2 and 3.

Referring now to FIG. 9, a method 300 of directing the detection lobe 260 of the microphone array 62 includes determining an orientation of the device 12, at block 302. For example, the accelerometer 174 is used to determine an orientation of the upper surface 104 relative to the lower surface 108. The accelerometer 174 is also used to determine an orientation of the first side surface 112 relative to the second side surface 116. That is, the accelerometer 174 is used to determine whether the device 12 is right-side up, up-side down, or sideways. If the device 12 is sideways, the accelerometer 174 determines whether the first side surface 112 or the second side surface 116 is facing upward.

At block 304, the controller 80 adjusts a direction of the detection lobe 260 based on input from the accelerometer 174. That is, the beamforming circuitry 176 uses beam steering to alter the sensitivity of the microphone array 62 so that a zenith 280 of the detection lobe 260 faces substantially upward within directional limits, at block 306. For example, the detection lobe 260 is adjusted to face upward from a ground surface. As an example, FIG. 10 illustrates the direction of the detection lobe 260 when the communication device 12 is in a sideways position. In one example, FIG. 11 illustrates the direction of the detection lobe 260 when the communication device 12 is in an upside down position. In one example, FIG. 12 illustrates the direction of the detection lobe 260 when the communication device 12 is in a right-side up position. Notably, in each example, the detection lobe 260 faces upward.

The disclosed embodiments include mobile wearable devices 12 worn by caregivers to provide hand-free voice communication. The devices 12 use hands-free mechanisms to establish a call or perform available functions. For example, using voice commands to establish a call. The mobile hands-free communication devices 12 are equipped with location detection/tracking capabilities. In some embodiments, the location information is an embedded solution, for example proximity detection between mobile devices directly, or tracked by an external system, for example a real-time locating system. Either of these methods inform the hands free communication system when some location-based criteria are met to enable a new set of behaviors for voice recognition and response. For example, under normal operation, a hands-free badge wakes up to anyone saying a predefined voice command in a room. If system 10 detects multiple users all wearing a communication device 12 in close proximity, the system 10 applies microphone beamforming and noise cancellation to filter voices based on user location. In an alternate example, detection of multiple co-located users could be combined with additional information, for example priority of user's role, to only respond to specific user's voice commands.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary. It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A communication device for use in a healthcare facility having a locating system configured to determine locations of assets in the healthcare facility, the device comprising:
    a housing configured to be worn by a caregiver;
    a microphone array carried by the housing and configured to detect sound signals within a detection lobe defined by an angle; and a controller configured to adjust a magnitude of the angle of the detection lobe in response to at least one message received from the locating system,
wherein the controller increases the magnitude of the angle of the detection lobe when the controller receives a message from the locating system that the device is the only device within a predetermined distance.

2. A communication device for use in a healthcare facility having a locating system configured to determine locations of assets in the healthcare facility, the device comprising:
a housing configured to be worn by a caregiver;
a microphone array carried by the housing and configured to detect sound signals within a detection lobe defined by an angle; and
a controller configured to adjust a magnitude of the angle of the detection lobe in response to at least one message received from the locating system, wherein the controller decreases the magnitude of the angle of the detection lobe when the controller receives a message from the locating system that more than one device is positioned within a predetermined distance.

3. A communication device for use in a healthcare facility having a locating system configured to determine locations of assets in the healthcare facility, the device comprising:
a housing configured to be worn by a caregiver;
a microphone array carried by the housing and configured to detect sound signals within a detection lobe defined by an angle; and
a controller configured to adjust a magnitude of the angle of the detection lobe in response to at least one message received from the locating system, wherein the controller decreases the magnitude of the angle of the detection lobe when the controller receives a message from the locating system that the device is positioned adjacent to a patient bed.

4. A communication device for use in a healthcare facility having a locating system configured to determine locations of assets in the healthcare facility, the device comprising:
a housing configured to be worn by a caregiver;
a microphone array carried by the housing and configured to detect sound signals within a detection lobe defined by an angle; and
a controller configured to adjust a magnitude of the angle of the detection lobe in response to at least one message received from the locating system, wherein:
the microphone array includes a plurality of microphones and each microphone of the plurality of microphones receives at least one of a plurality of sound signals;
the controller determines a time of arrival of each of the plurality of sound signals at the respective microphone of the plurality of microphones;
the controller infers a location of a source of each sound signal of the plurality of sound signals based on the time of arrival of each of the plurality of sound signals, and
wherein the controller adjusts the magnitude of the angle of the detection lobe by only processing the sound signals in directions of interest.

5. The device of claim 1, wherein the sound signals detected by the microphone array within the detection lobe include voice commands from the caregiver.

6. The device of claim 1, wherein the controller communicates with at least one of a locating system and remote devices in the healthcare facility through wireless signals.

7. The device of claim 1, wherein the microphone array includes a plurality of settings that are remotely adjustable.

8. The device of claim 1, wherein the locating system is an ultra-wideband locating system.

9. A communication device for use in a healthcare facility, comprising:
a housing configured to be worn on a caregiver;
a microphone array positioned within the housing and configured to detect sound signals within a detection lobe defined by an angle;
an accelerometer to determine an orientation of the housing; and
a controller configured to adjust a direction of the detection lobe based on input from the accelerometer,
wherein the controller communicates with a locating system to determine a position of the housing,
wherein the controller adjusts a magnitude of an angle of the detection lobe based a message from the locating system,
wherein the microphone array includes a plurality of microphones and each microphone of the plurality of microphones receives at least one of a plurality of sound signals,
wherein the controller determines a time of arrival of each of the plurality of sound signals at the respective microphone of the plurality of microphones,
wherein the controller infers a location of a source of each sound signals of the plurality of sound signals based on the time of arrival of each of the plurality of sound signals, and
wherein the controller adjusts the magnitude of the angle of the detection lobe by only processing the sound signals in directions of interest.

10. The device of claim 9, wherein the controller adjusts the direction of the detection lobe so that a zenith of the detection lobe is directed upward from a ground surface.

11. The device of claim 9, wherein the locating system is an ultra-wideband locating system.

12. The device of claim 9, wherein the sound signals detected by the microphone array within the detection lobe include voice commands from the caregiver.

13. The device of claim 9, wherein the controller communicates with at least one of a locating system and remote devices in the healthcare facility through wireless signals.

14. The device of claim 9, wherein the microphone array includes a plurality of settings that are remotely adjustable.

15. A system for operating a communication device in a healthcare facility, the system comprising:
a locating system configured to determine locations of assets in the healthcare facility; and
a communication device comprising:
a housing configured to be worn by a caregiver;
a microphone array carried by the housing and configured to detect sound signals within a detection lobe defined by an angle;
an accelerometer to determine an orientation of the housing; and
a controller configured to adjust a magnitude of the angle of the detection lobe in response to at least one message received from the locating system, the controller further configured to adjust a direction of the detection lobe based on input from the accelerometer,
wherein the controller adjusts the magnitude of the angle of the detection lobe based on a proximity of the communication device to at least one other device in the healthcare facility.

16. The system of claim 15, wherein the at least one other device comprises at least one other communication device.

17. The system of claim 15, wherein the at least one other device comprises a patient bed.

18. The system of claim 17, wherein the controller decreases the magnitude of the angle of the detection lobe when the controller receives a message from the locating system that the communication device is positioned adjacent to the patient bed.

19. The system of claim 15, wherein the controller decreases the magnitude of the angle of the detection lobe when the controller receives a message from the locating system that the at least one other device is positioned within a predetermined distance to the communication device.

20. The device of claim 15, wherein the controller adjusts a direction of the detection lobe so that a zenith of the detection lobe is directed upward from a ground surface based on a signal from the accelerometer.

\* \* \* \* \*